United States Patent
Diekmann et al.

(10) Patent No.: US 9,382,420 B2
(45) Date of Patent: Jul. 5, 2016

(54) POWDER COMPRISING POLYMER-COATED POLYMERIC CORE PARTICLES

(75) Inventors: Wolfgang Diekmann, Waltrop (DE); Franz-Erich Baumann, Dülmen (DE); Maik Grebe, Bochum (DE); Kristiane Warnke, Recklinghausen (DE); Sylvia Monsheimer, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 173 days.

(21) Appl. No.: 13/542,121

(22) Filed: Jul. 5, 2012

(65) Prior Publication Data
US 2013/0183529 A1 Jul. 18, 2013

(30) Foreign Application Priority Data
Jul. 6, 2011 (DE) .................. 10 2011 078 721

(51) Int. Cl.
| | | |
|---|---|---|
| C08L 71/08 | (2006.01) | |
| C09D 177/00 | (2006.01) | |
| C08L 77/10 | (2006.01) | |
| C08J 7/04 | (2006.01) | |
| C09D 177/10 | (2006.01) | |

(52) U.S. Cl.
CPC ............... C08L 71/08 (2013.01); C08J 7/047 (2013.01); C08L 77/10 (2013.01); C09D 177/10 (2013.01); C08J 2377/00 (2013.01); C08J 2477/00 (2013.01); Y10T 428/2998 (2015.01)

(58) Field of Classification Search
None
See application file for complete search history.

(56) References Cited

U.S. PATENT DOCUMENTS

| | | |
|---|---|---|
| 4,334,056 A | 6/1982 | Meyer et al. |
| 4,687,838 A | 8/1987 | Mumcu et al. |
| 4,689,364 A | 8/1987 | Mumcu et al. |
| 5,270,445 A * | 12/1993 | Hou .................. C08J 3/14 430/137.1 |
| 6,136,948 A | 10/2000 | Dickens, Jr. et al. |
| 6,245,281 B1 | 6/2001 | Scholten et al. |
| 7,879,938 B2 | 2/2011 | Häger et al. |
| 7,887,740 B2 | 2/2011 | Simon et al. |
| 2005/0276976 A1 | 12/2005 | Pfeifer et al. |
| 2006/0202395 A1 | 9/2006 | Monsheimer et al. |
| 2007/0183918 A1 | 8/2007 | Monsheimer et al. |
| 2007/0238056 A1 | 10/2007 | Baumann et al. |
| 2007/0267784 A1 | 11/2007 | Greiner |
| 2008/0249237 A1 | 10/2008 | Hager et al. |
| 2011/0118410 A1 | 5/2011 | Simon et al. |
| 2012/0077405 A1* | 3/2012 | Zhou et al. ..................... 442/346 |

FOREIGN PATENT DOCUMENTS

| | | | |
|---|---|---|---|
| DE | 198 26 135 A1 | | 12/1999 |
| WO | WO 9828398 | * | 7/1998 |

OTHER PUBLICATIONS

European Search Report issued Sep. 14, 2012, in European Patent Application No. 12172779.6 with English translation of category of cited documents.

* cited by examiner

*Primary Examiner* — Ronak Patel
(74) *Attorney, Agent, or Firm* — Oblon, McClelland, Maier & Neustadt, L.L.P.

(57) ABSTRACT

The invention relates to powder, comprising composite particles comprising core particles completely or partially coated with a precipitated first polymer, where the core particles comprise a second polymer which differs from the precipitated first polymer, and where the ratio of the $d_{50}$ median diameter of the composite particles to the $d_{50}$ median diameter of the core particles is 1.15 or greater. The invention further relates to processes of using the powders of the present invention to making moldings.

16 Claims, No Drawings

POWDER COMPRISING POLYMER-COATED POLYMERIC CORE PARTICLES

BACKGROUND OF THE INVENTION

The invention relates to a powder based on polymer-coated fillers which has advantages in terms of the stability of the production process, and density, to the use of the powder in shaping processes, and also to mouldings produced by a layer-by-layer process by which regions of a powder layer are selectively melted, with use of the powder. After cooling and solidification of the regions previously melted layer-by-layer, the moulding can be removed from the powder bed. The mouldings according to the invention moreover exhibit less susceptibility to warpage than conventional mouldings.

A task frequently encountered in very recent times is the rapid provision of prototypes. Particularly suitable processes are those which are based on pulverulent materials and in which the desired structures are produced layer-by-layer through selective melting and solidification. Supportive structures for overhangs and undercuts can be omitted here, because the powder bed surrounding the molten regions provides sufficient support. Nor is there any need for the subsequent operation of removing supports. The processes are also suitable for producing short runs.

The selectivity of the layer-by-layer process here can be provided by way of example by applying susceptors, absorbers, or inhibitors, or by masks, or by way of focussed introduction of energy, for example through a laser beam, or by way of glass fibers. The energy is introduced by way of electromagnetic radiation.

A process which has particularly good suitability for the purpose of rapid prototyping is selective laser sintering. In this process, plastics powders are briefly irradiated selectively in a chamber by a laser beam, and the powder particles which encounter the laser beam therefore melt. The molten particles coalesce and rapidly resolidify to give a solid mass. This process can provide simple and rapid production of three-dimensional products by repeated irradiation of a succession of freshly applied layers.

The laser sintering (rapid prototyping) process for producing mouldings from pulverulent polymers is described in detail in U.S. Pat. No. 6,136,948 and WO 96/06881. A wide variety of polymers and copolymers are disclosed in these references, where examples include polyacetate, polypropylene, polyethylene, ionomers and polyamide.

Other processes with good suitability are the SIB processes described in WO 01/38061, and a process described in EP 1 015 214. Both processes operate with large-surface-area infrared heating for melting of the powder. The selectivity of the melting process is achieved in the first case by applying an inhibitor, and in the second process it is achieved by a mask.

DE 103 11 438 describes another process, where the energy required for the fusion process is introduced through a microwave generator and the selectivity is achieved by applying a susceptor.

Other suitable processes are those operating with an absorber which is either present in the powder or is applied by ink-jet processes, as described in DE 10 2004 012 682.8, DE 10 2004 012 683.6 and DE 10 2004 020 452.7.

The rapid prototyping or rapid manufacturing processes mentioned (RP or RM processes) can use pulverulent substrates, in particular polymers, preferably selected from polyesters, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture thereof.

WO 95/11006 describes a polymer powder which is suitable for the laser sintering process and which, when melting behaviour is determined by differential scanning calorimetry with a scanning rate of form 10 to 20° C./min, exhibits no overlap of the melting and recrystallization peak, has a degree of crystallinity of from 10 to 90%, likewise determined by DSC, has a number-average molecular weight Mn of from 30 000 to 500 000, and has a Mw/Mn quotient in the range from 1 to 5.

DE 197 47 309 describes the use of a nylon-12 powder which has increased melting point and increased enthalpy of fusion and which is obtained by reprecipitation of a polyamide previously produced through ring-opening and subsequent polycondensation of laurolactam. This is a nylon-12.

WO 2007/051691 describes processes for producing ultra-fine powders based on polyamides, by precipitating polyamides in the presence of inorganic particles, where a suspension is used with inorganic particles suspended in the alcoholic medium, where the $d_{50}$ median size of the inorganic particles is in the range from 0.001 to 0.8 µm. The process was aimed at achieving colouring of the powder. Fine polyamide powders were obtained here, and, because of their small size, the inorganic particles have uniform distribution in the composite particles here.

DE 10 2004 003 485 describes the use of particles with at least one cavity for use in processes that build layers. All of the particles here comprise at least one cavity, and the particles comprising the cavity are melted by introduction of electromagnetic energy. The powder particles described have a thin surface layer.

DE 102 27 224 describes a granulated material which is intended for 3D binder printing and which is composed of particles provided with a surface layer comprising a non-polar external area. The surface layer of the powder particles described is, however, thin.

The powders described above are sometimes mixed with other particles for reinforcement, e.g. metal particles, glass particles or $TiO_2$ particles. However, a disadvantage here is that the handling of powder mixtures of this type often leads to demixing phenomena, and the mechanical properties that the reinforcing material is intended to achieve therefore sometimes vary. The regions where the proportion of filler is too high become very brittle and therefore unusable, and the regions comprising too little filler are softer than intended. The demixing derives from the different density of the polymer particles and of the filler, and tends to be apparent to some extent during any transport of the powder mixture and during its handling. In particular if the handling of the powder is automated in the rapid manufacturing process, it is difficult to control deviations in the properties of the components produced.

It was an object of the present invention to eliminate the problem of the demixing phenomenon and to achieve an improvement in the consistency of mechanical properties which the reinforcing material is intended to achieve in the moulding.

BRIEF SUMMARY OF THE INVENTION

The present invention relates to a powder, comprising composite particles comprising core particles completely or partially coated with a precipitated first polymer, where the core particles comprise a second polymer which differs from the precipitated first polymer, and where the ratio of the $d_{50}$ median diameter of the composite particles to the $d_{50}$ median diameter of the core particles is 1.15 or greater.

DETAILED DESCRIPTION OF THE INVENTION

The technical object was achieved through a powder for use in a layer-by-layer process for producing mouldings by selectively melting regions of the respective powder layer through introduction of electromagnetic energy, comprising composite particles which are produced from core particles completely or partially coated with a precipitated first polymer, where the core particles comprise a second polymer or have been manufactured from a second polymer which differs from the precipitated first polymer, and where the ratio of the $d_{50}$ median diameter of the composite particles to the $d_{50}$ median diameter of the core particles is 1.15 or greater.

The $d_{50}$ median diameter of the core particles here in all three spatial directions is 1 μm or greater, preferably from 1 to 100 μm. The data for the diameters of the core particles relate here to the particles (core) not yet coated by the precipitated polymer.

As mentioned above, the core particles, which provide the core in the composite particle to be formed, comprise a second polymer. It is particularly preferable that the core particles have been manufactured from a second polymer.

In another preferred embodiment, the second polymer has been selected from the group consisting of a polycarbonate, a polymethyl methacrylate, a polypropylene, a polybutylene terephthalate, a polyethylene terephthalate, a polyether ether ketone and a polyphthalamide. The core particles which comprise of a second polymer or consist of a second polymer, are, for example, produced by milling.

The layer-by-layer process for producing mouldings is preferably selective laser sintering.

Surprisingly, it has now been found that, by using core particles which comprise a polymer or have been manufactured therefrom, as reinforcing material firmly bonded to the precipitated first polymer (composite particles), it is possible, through a layer-by-layer process in which regions of the respective powder layer are selectively melted, to produce mouldings which have advantages in relation to density and susceptibility to warpage and with this have better properties in relation to consistency of processing than those made of a non-inventive reinforced polymer powder.

Because of the firm bond between polymer and filler, the powder according to the present invention is no longer subject to the problems of demixing, and this leads to an improvement in consistency of mechanical properties in the moulding produced from the powder. Since demixing no longer occurs in the powder according to the invention, it is possible to use the powder in construction processes to produce uniform components and components with uniform quality. The durably uniform constitution resulting from the firm bond between polymer and core particle significantly improves the recyclability of the powder, even when a plurality of stages are involved. Another advantage is obtained from the use of low-cost polymeric fillers (second polymer) as core of the composite particles. An additional advantage is obtained if powders with relatively low weight, and mouldings with relatively low weight produced therefrom, are desired, when comparison is made with other fillers with higher densities. There are also advantages in the use of the powders according to the invention: the powders according to the invention can be stored, transported and used in larger packaging units without any possibility of demixing. Feed quantities of the product can therefore also be greater during the laser sintering process, i.e. more powder can be charged to the sample feed container, and/or the dimensions of the sample feed container can be greater, without any resultant adverse effect on the quality of the resultant components. Furthermore, fluidization in the feed does not lead to the demixing that is frequently observed in known systems. Because the powders of the present invention have an exterior shell made of polymer, the introduction of energy by the laser is also more uniform. With non-inventive powders, however, the laser sometimes encounters a polymer particle and sometimes encounters a filler particle. As a function of filler type, the result can vary in extreme cases from almost complete absorption to almost complete reflection of the energy. Powders according to the present invention advantageously avoid these problems.

The core particles used for coating with the precipitated first polymer have preferably been manufactured from a second polymer. The use of a powder with a core made of polymer in a layer-by-layer process for producing mouldings provides a reinforcing effect. In contrast to polymer powders simply mixed with other particles (dry blend), the powders according to the present invention no longer exhibit demixing.

The core particles which comprise the second polymer or which consist of the second polymer provide the core in the composite particle. The powder according to the present invention preferably has a core-shell structure. The second polymer of the core particle can be any known polymer, as long as the second polymer is not, or in essence not, soluble in the solvent in which the precipitatable first polymer is dissolved. The second polymer therefore differs from the (precipitated or precipitatable) first polymer. The second polymer differs from the (precipitated or precipitatable) first polymer at least by virtue of its dissolution properties in a given solvent which dissolves the first polymer.

The core particles to be coated can by this stage be present in a composite with inorganic material, for example with metal oxides (such as $Al_2O_3$, $TiO_2$, $ZrO_2$, ZnO, $Bi_2O_3$) or with $SiO_2$, polyphosphates, phosphinates, boron nitride, boron carbide, mixed oxides, or spinels.

The respective core particles can take the following forms: spherical, lamellar or elongate. The respective core particles can be sharp-edged, rounded or smooth. The core particles mentioned can optionally be coated with sizes prior to application of the first polymer to be precipitated.

The precipitated or precipitatable first polymer is a polymer which can be dissolved in a liquid medium comprising a solvent and which precipitates in the form of a completely or partially insoluble deposit in the form of flakes or droplets, or in crystalline form, as a result of changes of certain parameters, e.g. temperature, pressure, solvent content, non-solvents, anti-solvents, or precipitants. The type of solvent and the solvent content depend here on the polymer, as also do the other parameters for dissolving or precipitating the appropriate polymer.

The precipitatable or precipitated first polymer has preferably been selected from the group consisting of a polyolefin, a polyethylene, a polypropylene, a polyvinyl chloridea, polyacetal, a polystyrene, a polyimide, a polysulphone, a poly(N-methylmethacrylimide) (PMMI), a polymethyl methacrylate (PMMA), a polyvinylidene fluoride (PVDF), an ionomer, a polyether ketone, a polyaryl ether ketone, a polyamide, a copolyamide, and mixtures thereof, in particular a mixture of a homopolyamide and a copolyamide.

In another embodiment, the precipitated first polymer for coating the core particles is obtained through precipitation of at least one polyamide of the AABB type or through joint precipitation of at least one polyamide of the AB type and at least one polyamide of the AABB type. Preference is given here to co-precipitated polyamides, where at least nylon-11 or nylon-12 and at least one polyamide based on PA1010, PA1012, PA1212 or PA1013 is present.

The following precipitatable polymers may be mentioned as examples: polyolefins and polyethylene can be dissolved in, e.g., toluene, xylene and/or 1,2,4-trichlorobenzene. Polypropylene can be dissolved in, e.g., toluene and/or xylene. Polyvinyl chloride can be dissolved in, e.g., acetone. Polyacetal can be dissolved in, e.g., DMF, DMAc and/or NMP. Polystyrene can be dissolved in, e.g., toluene. Polyimides can be dissolved in, e.g., NMP. Polysulphones can be dissolved in, e.g., sulpholane. Poly(N-methylmethacrylimides) (PMMI) can be dissolved in, e.g., DMAc and/or NMP. Polymethyl methacrylate (PMMA) can be dissolved in, e.g., acetone. Polyvinylidene fluorides can be dissolved in N-methylpyrrolidone (NMP), dimethylformamide (DMF), dimethylacetamide (DMAc) and/or cyclohexanone. Polyether ketones and polyaryl ether ketones can be dissolved in, e.g., diphenyl sulphone and/or in sulpholane. Polyamides can be dissolved in an alcoholic medium, preferably an ethanol-water mixture. As explained above, parameters such as temperature and pressure may have to be adjusted to dissolve a given polymer.

Once the first polymer has been dissolved, this first polymer is precipitated in the presence of the core particles which comprise a second polymer or consist of a second polymer, thereby coating these core particles completely or partially with the precipitated first polymer. As mentioned above, a second polymer is selected as core particle and typically does not dissolve under the conditions under which the first polymer dissolves. The precipitation of the first polymer can be initiated and/or accelerated by changing the pressure, changing the temperature, changing (reducing) the concentration of the solvent, and optionally adding a non-solvent, anti-solvent and/or precipitant. In the case of amorphous polymers, such as polystyrene, polysulphones, PMMI, PMMA, and ionomer, it is necessary to add a non-solvent to precipitate the relevant polymer.

The precipitatable first polymer is preferably a polyamide which has at least 8 carbon atoms per carbonamide group. The polymer is particularly preferably a polyamide which has 10 or more carbon atoms per carbonamide group. The polymer is very particularly preferably a polyamide selected from nylon-6,12 (PA 612), nylon-11 (PA 11) and nylon-12 (PA 12). The production process for the polyamides that can be used in the sinter powders according to the invention is well-known and, for the production of PA 12, can be found by way of example in the documents DE 29 06 647, DE 35 10 687, DE 35 10 691 and DE 44 21 454. The granulated polyamide material required can be purchased from various producers, and by way of example granulated nylon-12 material is available with trade name VESTAMID from Evonik Industries AG.

It is particularly preferable that the precipitated or precipitatable polymer is nylon-12.

It is moreover possible to use the corresponding copolyamides or mixtures of homo- and copolyamides which comprise at least 70 percent by weight of the units mentioned. Accordingly, they can comprise, as comonomers, from 0 to 30 percent by weight of one or more comonomers, such as caprolactam, hexamethylenediamine, 2-methyl-1,5-pentanediamine, 1,8-octamethylenediamine, dodecamethylenediamine, isophoronediamine, trimethylhexamethylenediamine, adipic acid, suberic acid, azeleic acid, sebacic acid, dodecanedioic acid, aminoundecanoic acid. The homo- and copolyamides mentioned, termed polyamides hereinafter, are used in the form of granulated materials or ground material, where the relative solution viscosity of these is from 1.5 to 2.0 (measured in 0.5% m-cresol solution at 25° C. in accordance with DIN 53 727), preferably from 1.70 to 1.95. They can be produced by polycondensation, or hydrolytic or acidolytic or activated anionic polymerization, or by known processes. It is preferable to use unregulated polyamides having $NH_2$/COOH end group ratios of from 40/60 to 60/40. However, it is also advantageously possible to use regulated polyamides and specifically preferably those in which the $NH_2$/COOH end group ratio is 90:10 and 80:20 or 10:90 and 20:80.

As previously explained above, the $d_{50}$ median diameter of the core particles is 1 μm or greater.

In a preferred embodiment, the size of the core particles in all three spatial directions is 1 μm or more.

In another preferred embodiment, the $d_{50}$ median diameter of the core particles which comprise a second polymer or consist of a second polymer is from 1 to 100 μm, preferably from 1 to 80 μm, with preference from 1 to 70 μm, more preferably from 1 to 60 μm, still more preferably from 1 to 50 μm, particularly preferably from 1 to 40 μm.

Suitable particle size distributions can be ensured by known processes, e.g., by sieving or sifting.

It is moreover preferable that the $d_{50}$ median diameter of the composite particles is from 20 to 150 μm, with preference from 20 to 120 μm, preferably from 20 to 100 μm, more preferably from 25 to 80 μm and particularly preferably from 25 to 70 μm.

In one preferred process, the thickness of the coating made of the precipitated polymer is 1.5 μm or more, preferably 2, 3, 5, 10, 15, 20, 25 or 30 μm or more.

The ratio, based on weight, of the polymer to the core particles, based on the entirety of the composite particles, is preferably from 0.1 to 30, with preference from 1.0 to 20.0 and more preferably from 1.3 to 10.0.

The ratio of the $d_{50}$ median diameter of the composite particles to the $d_{50}$ median diameter of the core particles is from 1.15 to 30, preferably from 1.2 to 30, with preference from 1.5 to 25; more preferably from 1.5 to 15, even more preferably from 1.5 to 12 and particularly preferably from 1.5 to 10.

In another preferred embodiment, the BET specific surface area of the powder according to the invention is in the range from 2 to 30 $m^2/g$, preferably from 2 to 15 $m^2/g$; particularly preferably from 3 to 12 $m^2/g$ and very particularly preferably from 3 to 10 $m^2/g$. The bulk density (BD) of the powder according to the invention is moreover in the range from 200 to 600 g/l, with preference from 200 to 500 g/l.

In another preferred embodiment, the density of the core particles is from 20% less than the density of the solvent used for the precipitation of the first polymer to greater than the density of said solvent. Preferably, the density of the core polymers is from 15% less than then density of the solvent used for the precipitation of the first polymer to greater than the density of said solvent. More preferably, the density of the core polymers is from 10% less than then density of the solvent used for the precipitation of the first polymer to greater than the density of said solvent. Even more preferably, the density of the core polymers is from 5% less than then density of the solvent used for the precipitation of the first polymer to greater than the density of said solvent.

It is particularly preferable to use an alkanol (for example: methanol, ethanol, propanol or butanol), preferably ethanol, as solvent for the precipitation of the first polymer in the presence of the core particles, where the density of the core particles is greater or not more than 20%, with preference not more than 15%, more preferably not more than 10% and particularly preferably not more than 5% smaller than the density of the alkanol, preferably of ethanol.

The powder can comprise the composite particles mentioned alone or together with, admixed therewith in uncompacted form, (dry-blend) fillers, and/or auxiliaries. The proportion of the composite particles in the powder is at least 50% by weight, with preference at least 80% by weight, preferably at least 90% by weight, particularly preferably at least 95% by weight and very particularly preferably at least 99% by weight.

The powders according to the invention can optionally comprise auxiliaries and/or other organic or inorganic pigments. These auxiliaries can be, e.g., powder-flow aids, e.g. precipitated and/or fumed silicas. Exemplary precipitated are those with product name AEROSIL® with various specifications from Evonik Industries AG. It is preferable that the powder according to the invention comprises less than 3% by weight of these auxiliaries, with preference from 0.001 to 2% by weight and very particularly preferably from 0.025 to 1% by weight, based on the entirety of the polymers present. The pigments can by way of example be titanium dioxide particles based on rutile (preferably) or anatase, or carbon black particles.

In order to improve processability or for further modification of the powder according to the invention, inorganic foreign pigments, e.g. transition metal oxides, stabilizers, e.g. phenols, in particular sterically hindered phenols, flow aids and powder-flow aids, e.g. fumed silicas, can be added thereto. The amount of the substances added to the polymers, based on the total weight of polymers in the polymer powder, is preferably such as to provide compliance with the concentrations stated for auxiliaries for the powder according to the invention.

Ideal properties in the further processing of the powder are achieved when the melting point of the first polymer in the first heating procedure is greater than in the second heating procedure, measured by differential scanning calorimetry (DSC); and when the enthalpy of fusion of the polymer in the first heating procedure is at least 50% greater than in the second heating procedure, measured by differential scanning calorimetry (DSC). With this, the polymer of the shell of the composite particles (the first polymer) has higher crystallinity when compared with powders which can be produced by processes other than co-precipitation of a dissolved polymer with particles. A particularly suitable material for the laser sintering process is a nylon-12 which has a melting point of from 185 to 189° C., with preference from 186 to 188° C., an enthalpy of fusion of 112+/−17 kJ/mol, with preference from 100 to 125 kJ/mol, and a freezing point of from 138 to 143° C., preferably from 140 to 142° C.

The invention also provides a process for producing the abovementioned powders according to the invention, where, in order to produce an at least partial solution, a polymer is brought into contact, in the presence of core particles, with exposure to pressure and/or heat, with a medium comprising solvent which dissolves the first polymer, and then the first polymer is precipitated from the at least partial solution, and composite particles are obtained which are produced by core particles coated entirely or partially with a precipitated first polymer, where the core particles comprise a second polymer or have been manufactured from a second polymer which differs from the precipitated first polymer, and where the ratio of the $d_{50}$ median diameter of the composite particles to the $d_{50}$ median diameter of the core particles is 1.15 or greater.

In one preferred process, the $d_{50}$ median diameter of the core particles (core of the composite particle) is 1 μm or greater, preferably from 1 to 100 μm, preferably from 10 to 80 μm, with preference from 10 to 70 μm, preferably from 10 to 60 μm, more preferably from 10 to 50 μm, particularly preferably from 10 to 40 μm. Suitable particle size distributions can be ensured by known processes, e.g., by sieving or sifting.

The use of polymeric core particles which are in suspension in the solvent for the precipitatable first polymer is particularly important here. A feature of one preferred variant of the process of the invention is that a suspension of polymeric core particles suspended in the alcoholic medium is used, where the ($d_{50}$) median size of the core particles is the size stated above.

The $d_{50}$ median diameter of the composite particles produced by the production process is preferably from 20 to 150 μm, with preference from 20 to 120 μm, preferably from 20 to 100 μm, more preferably from 25 to 80 μm and particularly preferably from 25 to 70 μm.

An advantage of the process according to the invention is provided by saving an operation during the production of the powder, because there is no longer any need for the dry-blend mixing of polymer particles and auxiliary particles and/or filler particles.

In a preferred process, the core particles comprise a second polymer or have been manufactured therefrom. The core particles can, as a function of their nature, be solid beads, hollow beads, or porous beads. The respective core particles can have the following shapes: spherical, lamellar or elongate. The respective core particles can moreover be sharp-edged, rounded-off or smooth particles. The core particles mentioned can optionally also have been coated with sizes prior to application of the precipitated first polymer.

It is preferable that the precipitatable first polymer has been selected from polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide, and mixtures thereof, in particular mixtures of homo- and copolyamide.

In another embodiment, the first polymer for coating of the core particles is obtained through precipitation of at least one polyamide of AABB type or through joint precipitation of at least one polyamide of AB type and of at least one polyamide of AABB type. Preference is given to co-precipitated polyamides, where at least nylon-11 or nylon-12 and at least one polyamide based on PA1010, PA1012, PA1212 or PA1013 is present.

The type of solvent and the content of solvent, and also the other parameters for dissolving and reprecipitating the appropriate polymer, depend on the polymer here and have already been explained above.

The explanations below relate to precipitatable first polymers which can be dissolved in the alcoholic medium, in particular polyamides. For the coating of core particles with polymers for which other solvents are used, the parameters and solvents must be modified appropriately.

A feature of a preferred embodiment of the process of the invention is that a suspension is used which is obtained by suspending the core particles in the medium comprising solvent which dissolves the precipitatable first polymer, for example an alcoholic medium, with introduction of energy input greater than 1000 kJ/m$^3$. This generally produces very useful suspensions of the core particles in the medium. The energy input mentioned can be achieved through known assemblies, such as planetary-gear kneaders, rotor-stator machinery, an agitated ball mill, a roll mill or the like.

The suspensions that are useful for the invention are produced in a medium comprising solvents which dissolve the precipitatable first polymer, for example an alcoholic medium. In the case of an alcoholic medium, this can be a pure alcohol, a mixture of a plurality of alcohols, or else alcohols with content of water or of other substances which do not in essence have any disadvantageous effect on the desired reprecipitation of the polyamides. The alcoholic medium of the suspensions preferably has less than 50% by weight content of non-alcoholic substances (preferably water), particularly preferably comprising less than 30% by weight, and particularly advantageously less than 10% by weight, of foreign non-alcoholic substances. The invention can generally use any of the types of alcohols or mixtures thereof which permit reprecipitation of polymers, preferably polyamides, under the desired conditions (pressure and temperature). In any particular case, it is relatively easy for the person skilled in the art to modify the system to meet specific requirements. The process of the invention preferably uses, as alcoholic medium for the reprecipitation of the polyamide and/or the suspension of the core particles, one or more alcohols which have a numeric ratio of oxygen atoms to carbon atoms in the range from 1:1 to 1:5.

Typical alcohols for producing the suspension of the core particles are those where the ratio of oxygen to carbon is 1:1, 1:2, 1:3, 1:4 or 1:5, preferably those where the ratio of oxygen to carbon is 1:2 or 1:3, particularly preferably where the oxygen to carbon ratio is 1:2. It is very particularly advantageous to use ethanol for producing a suspension of the core particles, and also for the reprecipitation of the precipitatable polymer, preferably of the polyamides.

As explained above, the precipitatable first polymer has preferably been selected from polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. The precipitatable polyamide is dissolved in an appropriate solvent so that it can be reprecipitated on the surface of the core particles for coating the same.

Preferred reprecipitatable polymers are polyamides. The precipitatable polymer is preferably a polyamide which has at least 8 carbon atoms per carbonamide group. It is particularly preferable that the polymer is a polyamide which has 10 or more carbon atoms per carbonamide group. Polyamides which can preferably be used as starting material for the process of the invention comprise inter alia nylon-11, nylon-12 and polyamides having more than 12 aliphatically bonded carbon atoms per carbonamide group, preferably nylon-12. It is moreover possible to use the corresponding copolyamides or a mixture of homo- and copolyamides where these comprise at least 70 percent by weight of the units mentioned. They can accordingly comprise from 0 to 30 percent by weight of one or more comonomers, such as caprolactam, hexamethylenediamine, 2-methyl-1,5-pentanediamine, 1,8-octamethylenediamine, dodecamethylenediamine, isophoronediamine, trimethylhexamethylenediamine, adipic acid, suberic acid, azeleic acid, sebacic acid, dodecanedioic acid or aminoundecanoic acid. The homo- and copolyamides mentioned and termed polyamides hereinafter are used in the form of granulated materials or ground material, where the relative solution viscosity of these is from 1.5 to 2.0 (measured in 0.5% m-cresol solution at 25° C. in accordance with DIN 53 727), preferably from 1.70 to 1.95. They can be produced by polycondensation, or hydrolytic or acidolytic or activated anionic polymerization, by known processes. It is preferable to use unregulated polyamides with $NH_2$/COOH end group ratios of from 40/60 to 60/40. The polyamide used can comprise at most 0.2 percent by weight of $H_3PO_4$. It is preferable to use $H_3PO_4$-free polyamide. However, regulated polyamides, preferably those in which the $NH_2$/COOH end group ratio is 90:10 and 80:20 or 10:90 and 20:80, can advantageously be used.

Any of the known methods can be used to produce the solution of the precipitatable first polymers, preferably the polyamides, for the reprecipitation process. It is advantageous to achieve maximum completeness of dissolution of the precipitatable polymers, preferably of the polyamide, in the appropriate medium, preferably an alcoholic medium, in the presence of the core particles suspended therein. Dissolution can be promoted by use of pressure and/or heat. In an advantageous procedure, the precipitatable polymer, preferably the polyamide, is initially present in the alcoholic medium and is dissolved with exposure to elevated temperature for the required time. The suspension of the core particles can be added prior to, during or after the dissolution of the precipitatable polymer, preferably the polyamide. The suspension of the core particles is advantageously present together with the precipitatable polymer, preferably the polyamide, in the starting mixture. The dissolution procedure is advantageously assisted by the use of appropriate agitation assemblies. The precipitation of the precipitatable polymer, preferably the polyamide, can equally be assisted by using pressure and/or heat, preferably using a temperature reduction and/or removal of the solvent, i.e. of the alcoholic medium, by distillation (preferably under reduced pressure) to precipitate the precipitatable polymer, preferably the polyamide. However, it is also possible to assist the precipitation process by adding an anti-solvent (precipitant).

In another preferred process, after formation of the composite particles, a post-treatment is carried out in a mixer with high shear. The temperature here is particularly preferably above the glass transition temperature of the respective polymer. This measure serves to round the grains and improve powder-flowability.

The abovementioned parameters are determined as follows:

BET surface area was determined in accordance with DIN ISO 9277: 2003-05 with gas-adsorption equipment from Micromeritics for determining specific surface area by the BET method (Micromeritics TriStar 3000 V6.03: V6.03 refers to the software version of the Win3000 Software). BET surface area was determined by means of nitrogen gas adsorption by the discontinuous volumetric method (DIN ISO 9277: 2003-05, Section 6.3.1.). For this, a number (seven) of measurement points were determined at relative pressures P/P0 from 0.05 to 0.20. He (purity at least 4.6 [99.996%] according to operating instructions, or at least 4.0 [99.99%] according to standard; this also applies to $N_2$) was used for dead volume calibration. The samples were devolatilized respectively for 1 hour at room temperature (21° C.) and 16 hours at 80° C. in vacuo. The specific surface area was based on the devolatilized specimen. The evaluation used multipoint determination (DIN ISO 9277:2003-05, Section 7.2). The temperature during the measurement was 77 K.

The particle size ($d_{50}$ fineness) was determined by means of laser scattering. The measurements were carried out with a Malvern Mastersizer 2000. A dry measurement is involved here. For the measurement, in each case from 20 to 40 g of powder were metered into the system with the aid of Scirocco dry-dispersion equipment. The feed rate used to operate the vibrating trough was 70%. The pressure of the dispersion air was 3 bar. Each measurement involved a background measurement (10 seconds/10 000 individual measurements). The measurement time for the sample was 5 seconds (5000 individual measurements). The refractive index, and also the blue-light value, was defined as 1.52. Evaluation was based on the Mie theory.

Bulk density is calculated in accordance with DIN EN ISO 60.

Particle content is determined by ash/ignition residue determination in accordance with DIN EN ISO 3451 Part 1 and Part 4.

Solution viscosity was determined in 0.5% meta-cresol solution in accordance with ISO 307.

The present invention also provides processes for producing mouldings by a layer-by-layer process in which regions of the respective powder layer are selectively melted through introduction of electromagnetic energy, where the selectivity is achieved by applying susceptors, inhibitors, or absorbers or by masks, where a powder is used which comprises composite particles which are produced by core particles coated entirely or partially with a precipitated first polymer, where the core particles comprise a second polymer or have been manufactured from a second polymer which differs from the precipitated first polymer, and where the ratio of the $d_{50}$ median diameter of the composite particles to the $d_{50}$ median diameter of the core particles is 1.15 or greater.

The present invention also provides mouldings obtained from the powder according to the invention by the abovementioned process. The moulding thus produced here comprises (a) polymer(s) preferably selected from polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. In another embodiment, the polymer is at least one polyamide of AABB type or a mixture of at least one polyamide of AB type and of at least one polyamide of AABB type. Preference is given here to mixtures of polyamides where at least nylon-11 or nylon-12 and at least one polyamide based on PA1010, PA1012, PA1212 or PA1013 is present.

The process with use of the powder according to the invention provides advantages in that the powder no longer demixes, fewer cavities are produced in the component, and recyclability is better, and the components have higher density and uniform quality, and also in that there is clear separation between molten and non-molten regions, and in that the components have low warpage.

The energy is introduced through electromagnetic radiation, and the selectivity is introduced by way of example by masks, or application of inhibitors, absorbers or susceptors, or else by focussing of the radiation, for example by lasers. The electromagnetic radiation comprises the range from 100 nm to 10 cm, preferably from 400 nm to 10 600 nm or from 800 to 1060 nm. The source of the radiation can by way of example be a microwave generator, a suitable laser, a fibre laser, a radiant heat source or a lamp, or else a combination thereof. After cooling of all of the layers, the moulding can be removed.

The following examples of processes of this type serve for illustration, but there is no intention that the invention be restricted thereto.

Laser sintering processes are known and are based on the selective sintering of polymer particles, where layers of polymer particles are briefly exposed to laser light and the polymer particles exposed to the laser light bond to one another. The successive sintering of layers of polymer particles produces three-dimensional objects. Details concerning the selective laser sintering process can be found in, e.g., U.S. Pat. No. 6,136,948 and WO 96/06881.

Other processes with good suitability are the SIB processes described in WO 01/38061, and a process described in EP 1 015 214. Both processes operate with large-surface-area infrared heating for melting of the powder.

The selectivity of the melting process is achieved in the first case by applying an inhibitor, and in the second process it is achieved by a mask. DE 103 11 438 describes another process. In this, the energy required for the fusion process is introduced through a microwave generator, and the selectivity is achieved by applying a susceptor.

Other suitable processes are those operating with an absorber which is either present in the powder or is applied by ink-jet processes, as described in DE 10 2004 012 682.8, DE 10 2004 012 683.6 and DE 10 2004 020 452.7.

A feature of the mouldings which are produced by a layer-by-layer process in which regions are selectively melted is that they comprise at least one polymer, and also one polymeric reinforcing material, and that the density of the composite component here is reduced when comparison is made with a component produced from composite non-inventive powder. Susceptibility to warpage is moreover reduced, and an improvement is achieved in the reproducibility of mechanical properties in the moulding.

The mouldings can further comprise auxiliaries (the data here being as for the polymer powder), e.g. heat stabilizers, e.g. sterically hindered phenol derivatives. The mouldings preferably comprise less than 3% by weight of these auxiliaries, based on the entirety of the polymers present, particularly preferably from 0.001 to 2% by weight and very particularly preferably from 0.05 to 1% by weight.

Application sectors for the mouldings can be found both in rapid prototyping and in rapid manufacturing. The latter certainly also means small runs, i.e. the production of more than one identical part, where production by injection moulding is not economic. Examples here are parts for high specification cars of which only small numbers of units are produced, or replacement parts for motorsport, where availability time is important, as well as the small numbers of units.

Sectors in which the parts are used can be the aerospace industry, medical technology, mechanical engineering, automobile construction, the sports industry, the household goods industry, the electrical industry, and the lifestyle sector.

The invention also provides the use of the powder according to the invention in a process for producing mouldings by a layer-by-layer process in which regions of the respective powder layer are selectively melted through introduction of electromagnetic energy, where the selectivity is achieved by applying susceptors, inhibitors, or absorbers or by masks, where at least one powder is used which comprises composite particles which are coated entirely or partially with a precipitated first polymer, where the core particles comprise a second polymer or have been manufactured from a second polymer which differs from the precipitated first polymer, and where the ratio of the $d_{50}$ median diameter of the composite particles to the $d_{50}$ median diameter of the core particles is 1.15 or greater.

The examples below are intended to describe the powder according to the invention, and also use of the same, without restricting the invention to the examples. The values measured for bulk density were determined by an apparatus in accordance with DIN EN ISO 60.

EXAMPLES

Example 1

Reprecipitation of Nylon-12 (PA 12) (not According to the Invention)

400 kg of unregulated PA 12 produced by hydrolytic polymerization and having a relative solution viscosity of 1.62 and 75 mmol/kg of COOH end group content and 69 mmol/kg of NH$_2$ end group content were heated to 145° C. with 2500 l of ethanol denatured with 2-butanone and 1% water content, within a period of 5 hours in a 3 m$^3$ stirred tank (a=160 cm) and held at this temperature for 1 hour, with stirring (blade stirrer, x=80 cm, rotation rate=49 rpm). The jacket temperature was then reduced to 124° C. and the internal temperature was brought to 125° C. at the same stirrer rotation rate with continuous removal of the ethanol by distillation, with a cooling rate of 25 K/h. With the same cooling rate, the jacket temperature was held at from 2K to 3 K below the internal temperature. The internal temperature was brought to 117° C., with the same cooling rate, and was then held constant for 60 minutes. Material was then removed by distillation with a cooling rate of 40 K/h, and the internal temperature was thus brought to 111° C. At the temperature, the precipitation process began, discernible from the evolution of heat. The distillation rate was increased in such a way that the internal temperature did not rise beyond 111.3° C. After 25 minutes, the internal temperature fell, indicating the end of the precipitation process. The temperature of the suspension was brought to 45° C. by further removal of material by distillation and cooling by way of the jacket, and then the suspension was transferred to a paddle dryer. The ethanol was removed by distillation at 70° C./400 mbar, and the residue was then further dried for 3 hours at 20 mbar/86° C.

This gave a precipitated PA 12 with an average grain diameter of 55 p.m. Bulk density was 435 g/l.

By analogy with the procedure indicated in Example 1 or in accordance with DE 19708146, a powder was produced with particles as core and with a shell made of PA12, PA 10.12, PA10.10, PA6.12, PA6.13, PA10.13, PA6.18 and PA12.18.

Example 2

Single-Stage Reprecipitation of PA12 with Polymer Particles (According to the Invention)

As in Example 1, 250-375 kg of a PA 12 produced by hydrolytic polymerization with a relative solution viscosity ($\eta_{rel}$) of 1.62 and with 75 mmol/kg of COOH end group content and 66 mmol/kg of NH$_2$ end group content was reprecipitated in the presence of 17.5-258 kg of particles with the properties set out in Table 1. The particles used consist of VESTAKEEP® powder or VESTAMID® HT+ and provide the core of the composite particle to be formed.

TABLE 1

Properties of the various core particles used in Example 2:

| Particle | d$_{50}$ |
|---|---|
| VESTAKEEP ® powder (polyether ether ketone) | 21.9 μm |
| VESTAMID ® HT+ (polyphthalamide) | 60 μm |

In this example, the precipitation conditions were altered in the following way in comparison with Example 1:
Precipitation temperature: 108° C.
Precipitation time: 150 min Table 2 collates the characterization (bulk density, diameter and BET surface area) of the powders produced in accordance with Example 2. Alongside this, Table 2 also gives the amounts used of polyamide, core particles and ethanol, and also the stirrer rotation rate used in the process.

TABLE 2

Characterization of the powders produced in accordance with Example 2

| SR rpm | BD g/L | d$_{50}$ μm | BET m$^2$/g | EtOH L | PA kg | Particles kg |
|---|---|---|---|---|---|---|
| VESTAKEEP ® powder | | | | | | |
| 39 | 352 | 79 | 4.8 | 2500 | 348 | 17.5 |
| 39 | 300 | 70 | 5.7 | 2500 | 348 | 35 |
| 39 | 286 | 59 | 6.6 | 2500 | 348 | 52.5 |
| 39 | 276 | 52 | 7.3 | 2500 | 348 | 70 |
| 39 | 290 | 61 | 6.1 | 2500 | 348 | 87 |
| 39 | 279 | 57 | 6.6 | 2500 | 348 | 116 |
| 39 | 275 | 50 | 6.7 | 2500 | 348 | 150 |
| 39 | 268 | 40 | 7.2 | 2500 | 348 | 187.5 |
| 39 | 271 | 36 | 7.7 | 2500 | 348 | 232 |
| 39 | 274 | 31 | 7.6 | 2500 | 315 | 258 |
| 39 | 292 | 53 | 5.6 | 2500 | 348 | 116 |
| 39 | 270 | 35 | 6.7 | 2500 | 348 | 187 |
| 39 | 274 | 29 | 6.9 | 2500 | 315 | 258 |
| 39 | 287 | 56 | 6.5 | 2500 | 348 | 116 |
| 39 | 276 | 41 | 7.9 | 2500 | 348 | 187 |
| 39 | 282 | 31 | 9 | 2500 | 315 | 258 |
| 39 | 272 | 95 | 8.7 | 2500 | 348 | 116 |
| 39 | 258 | 57 | 8.4 | 2500 | 315 | 170 |
| 39 | 239 | 44 | 8.7 | 2500 | 272 | 223 |
| VESTAMID ® HT+ (10.6-10T) | | | | | | |
| 39 | 380 | 99 | 3.5 | 2500 | 348 | 18 |
| 39 | 341 | 83 | 4.4 | 2500 | 348 | 62 |
| 39 | 332 | 78 | 5 | 2500 | 348 | 117 |
| 39 | 321 | 78 | 5.7 | 2500 | 348 | 189 |
| 39 | 320 | 78 | 6.7 | 2500 | 348 | 233 |
| 39 | 410 | 132 | 3.3 | 2500 | 348 | 117 |

SR = stirrer rotation rate;
BD = bulk density

What is claimed is:

1. A powder, comprising composite particles, each composite particle comprising:
   a core of a second polymer particle; and
   a complete or partial coating of a first polymer;
   wherein the second polymer is selected from the group consisting of a polycarbonate, a polymethyl methacrylate, a polypropylene, a polybutylene terephthalate, a polyethylene terephthalate, a polyether ether ketone and a polyphthalamide
   the second polymer is different from the first polymer a d$_{50}$ median diameter of the composite particles is from 20 to 150 μm,
   a ratio of a d$_{50}$ median diameter of the composite particles to a d$_{50}$ median diameter of the core particles is from 1.15 to 30, and
   the coating of the first polymer on the core particle is obtained by precipitation of the first polymer onto the core particle, and the precipitated first polymer is selected from the group consisting of a polyolefin, a polyethylene, a polypropylene, a polyvinyl chloride, a polyacetal, a polystyrene, a polyimide, a polysulphone, a poly(N-methylmethacrylimide), a polymethyl methacrylate, a polyvinylidene fluoride, an ionomer, a polyether ketone, a polyaryl ether ketone, a polyamide, a copolyamide, and a mixture thereof.

2. The powder according to claim 1, wherein the core particles consist of the second polymer.

3. The powder according to claim 1, wherein the precipitated first polymer is a mixture of a homopolyamide and a copolyamide.

4. The powder according to claim 1, wherein the precipitated first polymer is selected from the group consisting of nylon-11, nylon-12, and a polyamide having more than 12 aliphatically bonded carbon atoms per carbonamide group.

5. The powder according to claim 1, wherein the $d_{50}$ median diameter of the core particles is 1 µm or greater.

6. The powder according to claim 1, wherein a weight ratio of the first polymer to the core particles, based on the entirety of the composite particles, is from 0.1 to 30.

7. The powder according to claim 1, wherein the ratio of the $d_{50}$ median diameter of the composite particles to the $d_{50}$ median diameter of the core particles is from 1.5 to 10.

8. The powder according to claim 1, wherein the ratio of the $d_{50}$ median diameter of the composite particles to the $d_{50}$ median diameter of the core particles is from 1.2 to 30.

9. The powder according to claim 1, wherein a density of the core particles is at least 20% less than the density of the solvent employed for the precipitation of the polymer.

10. The powder according to claim 1, wherein the density of the core particles is at least 15% less than the density of the solvent employed for the precipitation of the polymer.

11. The powder according to claim 1, wherein the proportion of the composite particles in the powder is at least 50% by weight, relative to the entire weight of the composite particles.

12. The powder according to claim 1, wherein the proportion of the composite particles in the powder is at least 80% by weight, relative to the entire weight of the composite particles.

13. A process for producing the powder of claim 1, comprising:
dissolving the first polymer in medium comprising a solvent operable for dissolving the first polymer in the presence of the core particles and in an atmosphere under pressure or heat; and
precipitating the first polymer onto a surface of the core particles to form a partial or entire coating of the first polymer on the core particles.

14. A powder obtained by a process according to claim 13.

15. A process for producing mouldings comprising forming at least one layer of the powder of claim 1 in the form of a mould and melting the powder with electromagnetic energy.

16. A moulding obtained by the process according to claim 15.

* * * * *